United States Patent [19]

Barnes et al.

[11] Patent Number: 5,400,206
[45] Date of Patent: Mar. 21, 1995

[54] SHORT CIRCUIT AND OVERLOAD PROTECTION CIRCUIT WHICH ALLOWS A PREDETERMINED NUMBER OF RECONNECTION ATTEMPTS

[75] Inventors: Kenneth F. Barnes, Stephenson County; Jimmy Yee, Winnebago County, both of Ill.

[73] Assignee: Honeywell Inc., Minneapolis, Minn.

[21] Appl. No.: 98,484

[22] Filed: Jul. 27, 1993

[51] Int. Cl.⁶ .............................................. H02H 3/07
[52] U.S. Cl. ........................................ 361/72; 361/71
[58] Field of Search ....................... 361/72, 73, 74, 75

[56] References Cited

U.S. PATENT DOCUMENTS

| | | | |
|---|---|---|---|
| 3,801,872 | 4/1974 | Zocholl et al. | 361/72 |
| 4,241,372 | 12/1980 | Sears | 361/72 |
| 4,316,230 | 2/1982 | Hansen et al. | 361/72 |
| 4,454,556 | 6/1984 | DePuy | 361/73 |
| 4,709,292 | 11/1987 | Kuriyama et al. | 361/72 |
| 4,795,980 | 1/1989 | Schmitt | 324/423 |

*Primary Examiner*—A. D. Pellinen
*Assistant Examiner*—Sally Medley
*Attorney, Agent, or Firm*—William D. Lanyi

[57] ABSTRACT

An overcurrent protection circuit is provided with a counter which permits a preselected number of reinitiations of current following the detection of an overcurrent condition. Each stoppage of current in response to the detection of an overcurrent condition is followed by a predetermined time delay and a subsequent reinitiation of current. After the predetermined number of reinitiations, current is permanently stopped from flowing between first and second circuit points until a manual reset occurs.

8 Claims, 4 Drawing Sheets

SHORT CIRCUIT AND OVERLOAD PROTECTION CIRCUIT WHICH ALLOWS A PREDETERMINED NUMBER OF RECONNECTION ATTEMPTS

BACKGROUND OF THE INVENTION

1. Field of the Invention

The present invention relates generally to short circuit or overload protection circuits and, more particularly, to a circuit of this type which disconnects an electrical load from a circuit and then reconnects the load with this procedure being repeated a predetermined number of times in an attempt to maintain electrical connection between the circuit and the load unless a true short circuit or overload situation exists.

2. Description of the Prior Art

Many different types of sensors are used in a manner in which they connect or disconnect a load from a source of voltage in response to a sensed condition. As an example, a photoelectric detector can be connected in series between a voltage source and an actuator so that the circuit is completed and the actuator is energized or deenergized when the photoelectric sensor detects a predetermined condition. Other types of sensors, such as a proximity detector, can be used in a similar manner.

A serious problem can occur when sensors are used in the manner described above. When the circuitry within the sensor causes the electrical load to be connected in series with the voltage source, the current flowing between the voltage source and the load passes through a portion of the sensor's interface circuitry. If a short circuit condition exists external to the sensor, such as in the external load, excessive currents can flow through portions of the sensor interface circuitry. This excessive current can damage or possibly destroy components within the sensor.

For these reasons, it is well known that an overcurrent detection circuit should be included as part of the sensor circuitry. Many different concepts are known to those skilled in the art for detecting an excessive current and for reacting to that high current. When an excessive current is detected passing through a portion of the sensor circuit, two reactions are generally known to those skilled in the art. First, the overload protection circuitry can immediately disconnect the load from the voltage source and require a manual reset operation before operation of the load can continue. Alternatively, some overload protection circuits temporarily disconnect the load from the voltage source and, after a predetermined period of time, reconnect the load to the source of electrical power. The overload protection circuit disconnects the load from the voltage source a second time. This procedure is continued until the overload condition is corrected or the power is manually turned off. Both alternatives can be disadvantageous, depending on the circumstances of the overcurrent condition. Both of these alternative schemes which are known to those skilled in the art can result in disadvantageous circumstances. For example, if the circuit is designed to immediately disconnect the load from the voltage source upon the first occurrence of an apparent overload condition, the circuit may react to a spurious and essentially harmless short duration current pulse, such as a noise transient, that triggers its operation. If a single overcurrent condition is sufficient to disconnect the load from the source, this type of occurrence would result in the necessity of a manual reset. In many circumstances, the inefficiency and lost time caused by this type of requirement for a manual reset is unacceptable. The alternative arrangement, which reinitiates current following each interruption when the circuit disconnects the load from the voltage source, can create severe damage to the circuit if the cause of the overload condition is a true short circuit of a permanent nature. By continually reinitiating the flow of current through the circuit, the overload protection circuit will place the affected components under repeated stress due to the magnitude of the current and this could eventually result in severe degradation or destruction of the affected circuit components. Therefore, it can be seen that both of the options described above can be disadvantageous in certain circumstances. The first option of immediately disconnecting the load upon the first occurrence of an overcurrent condition is not well suited to circumstances where short duration spurious current pulses can occur and the second option is not well suited in conditions where a true permanent overload condition exists.

U.S. Pat. No. 4,795,980, which issued to Schmitt on Jan. 3, 1989, discloses a device for monitoring short circuits and overloads in electronic proximity switches. The device described in this patent comprises a testing circuit which includes a current pickup which measures the current in the output circuit of a respective proximity switch which controls the output current flow by switching off or limiting the output current flow. The device also includes a circuit which provides a testing cycle for the current measurement with first and second delay times which control the output current during a short circuit or overload and a waiting time, substantially longer than the first delay time, between the start of two successive delay times. The length of the first delay time is chosen with respect to the time constant of the respective transmission line to be connected.

For the reasons described above, it would be significantly beneficial if an overload protection circuit was available which avoided the disadvantage of both of the procedures presently known to those skilled in the art.

SUMMARY OF THE INVENTION

In a preferred embodiment of the present invention, a circuit comprises a means for comparing a magnitude of a current to a predetermined value, wherein the monitored current flows between a first circuit point and a second circuit point. In addition, the circuit of the present invention comprises a means for stopping the current from flowing between the first and second circuit points in response to the current exceeding the predetermined value. The circuit comprises a means for reinitiating the current flow between the first and second circuit points upon the lapse of a predetermined period of time after the current is stopped by the stopping means. A means for counting the number of times that the current exceeds the predetermined value is also provided in addition to a means for preventing the reinitiation of the current after the current exceeds the predetermined value a predetermined number of times.

BRIEF DESCRIPTION OF THE DRAWINGS

The present invention will be more fully understood from a reading of the Description of the Preferred Embodiment in conjunction with the drawings, in which.

DESCRIPTION OF THE PREFERRED EMBODIMENT

Figure 1:
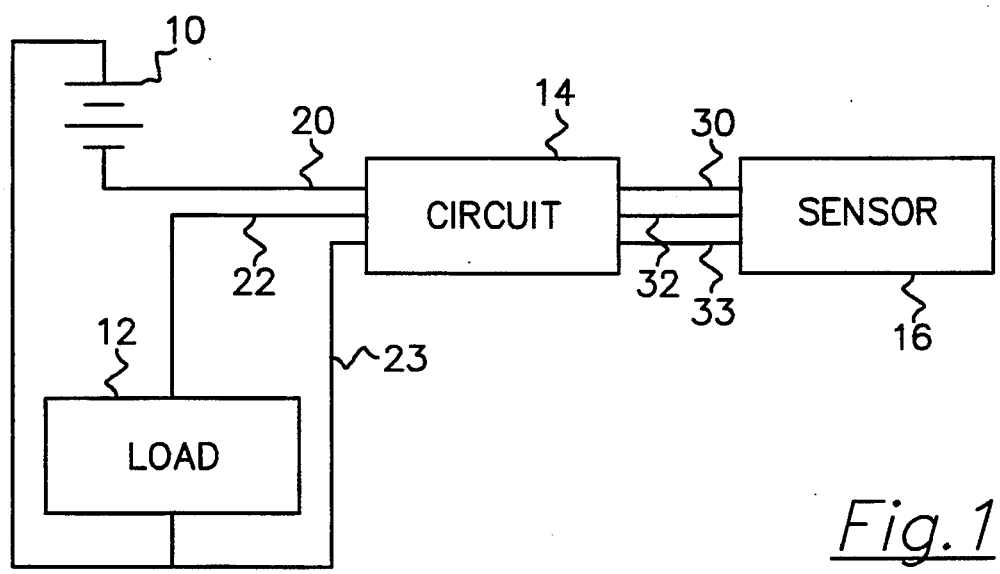
FIG. 1 illustrates a schematic representation of the relationship between the present invention and an electrical load.

Throughout the Description of the Preferred Embodiment, like components will be identified by like reference numerals.

FIG. 1 is a schematic representation of a voltage source 10 that is connectable in electrical communication with an electrical load 12. A circuit 14 is connected between the voltage source 10 and the load 12 and is capable of selectively connecting or disconnecting the load from the voltage source. The circuit 14 is associated with a sensor 16. When the sensor 16 detects a predefined stimulus, such as the presence or absence of an object in its sensing range, the circuit 14 either connects or disconnects the load 12 from the voltage source 10. Between the circuit 14 and the sensor 16, a DC input line 30 and a signal input line 32 are provided. Line 33 is a ground connection. The circuit 14 is connected to the voltage source 10 by a DC input line 20. The load 12 is connected to the circuit 14 by a sourcing output line 22. Line 23 represents a ground line.

With continued reference to FIG. 1, it can be seen that a short circuit condition in the load 12 can cause an overcurrent situation to occur on lines 20 and 22 and in a portion of the circuit 14.

Figure 2A:
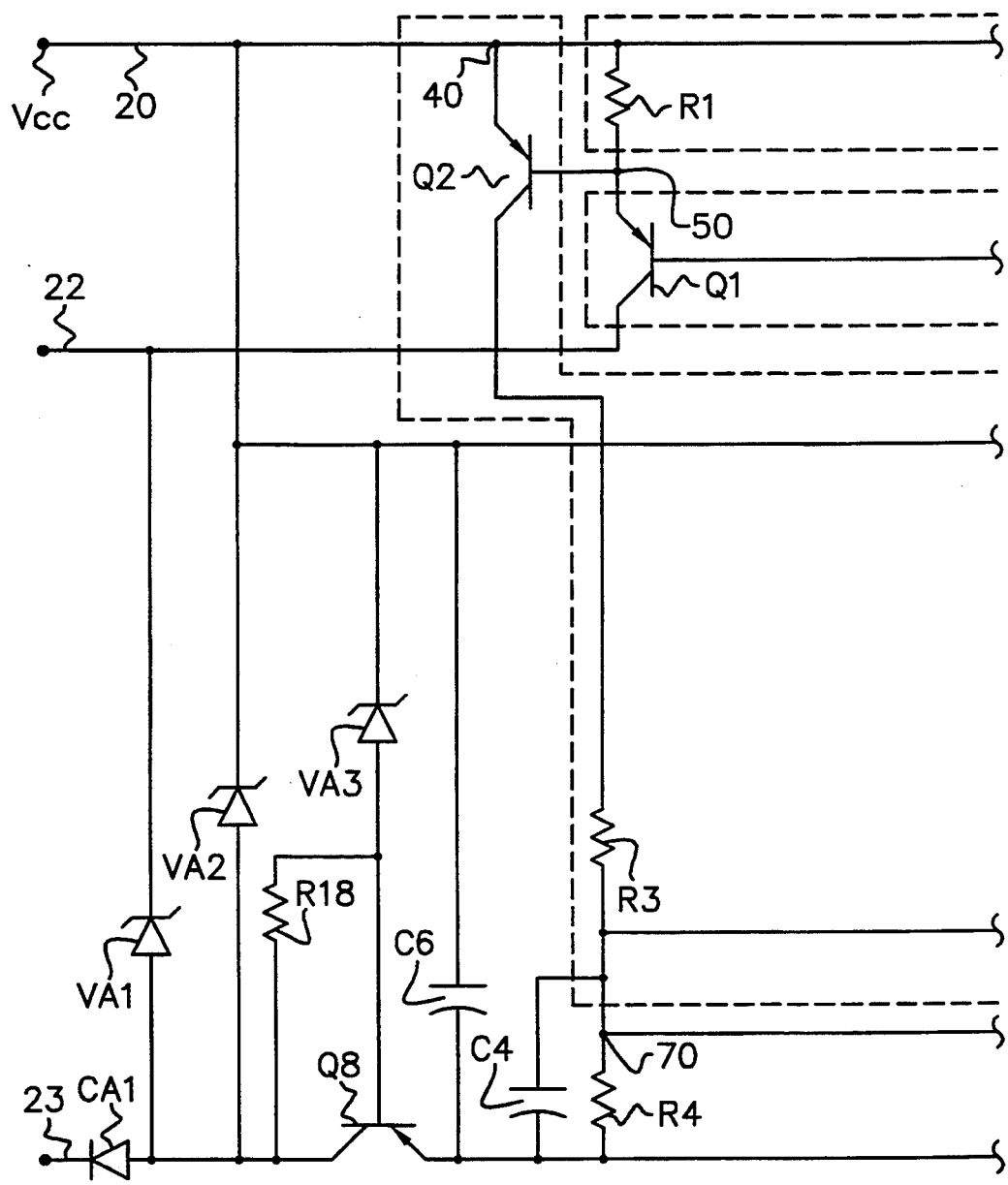
FIGS. 2A, 2B and 2C illustrate a detailed electrical schematic of a circuit in a preferred embodiment of the present invention.
Figure 2B:
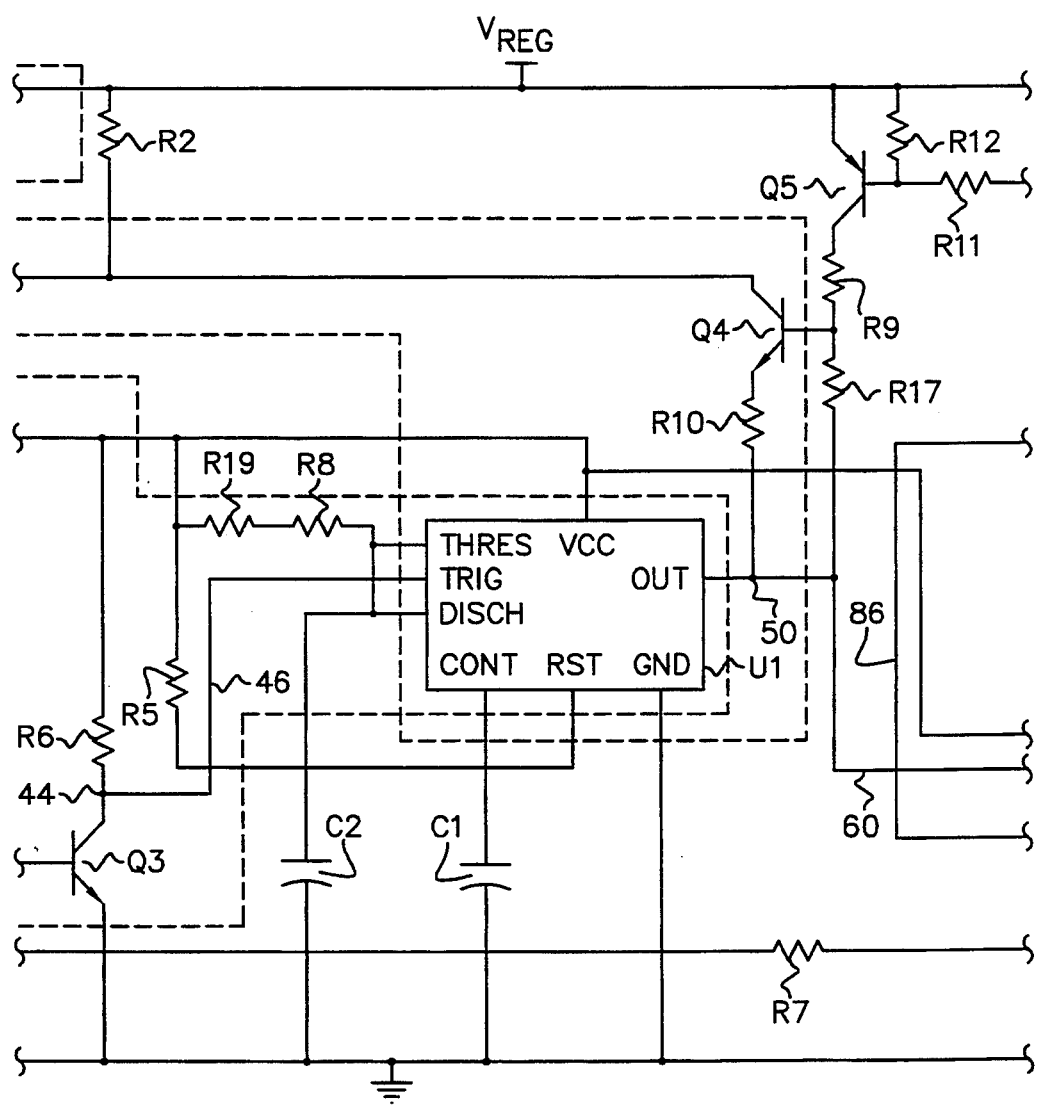
Figure 2C:
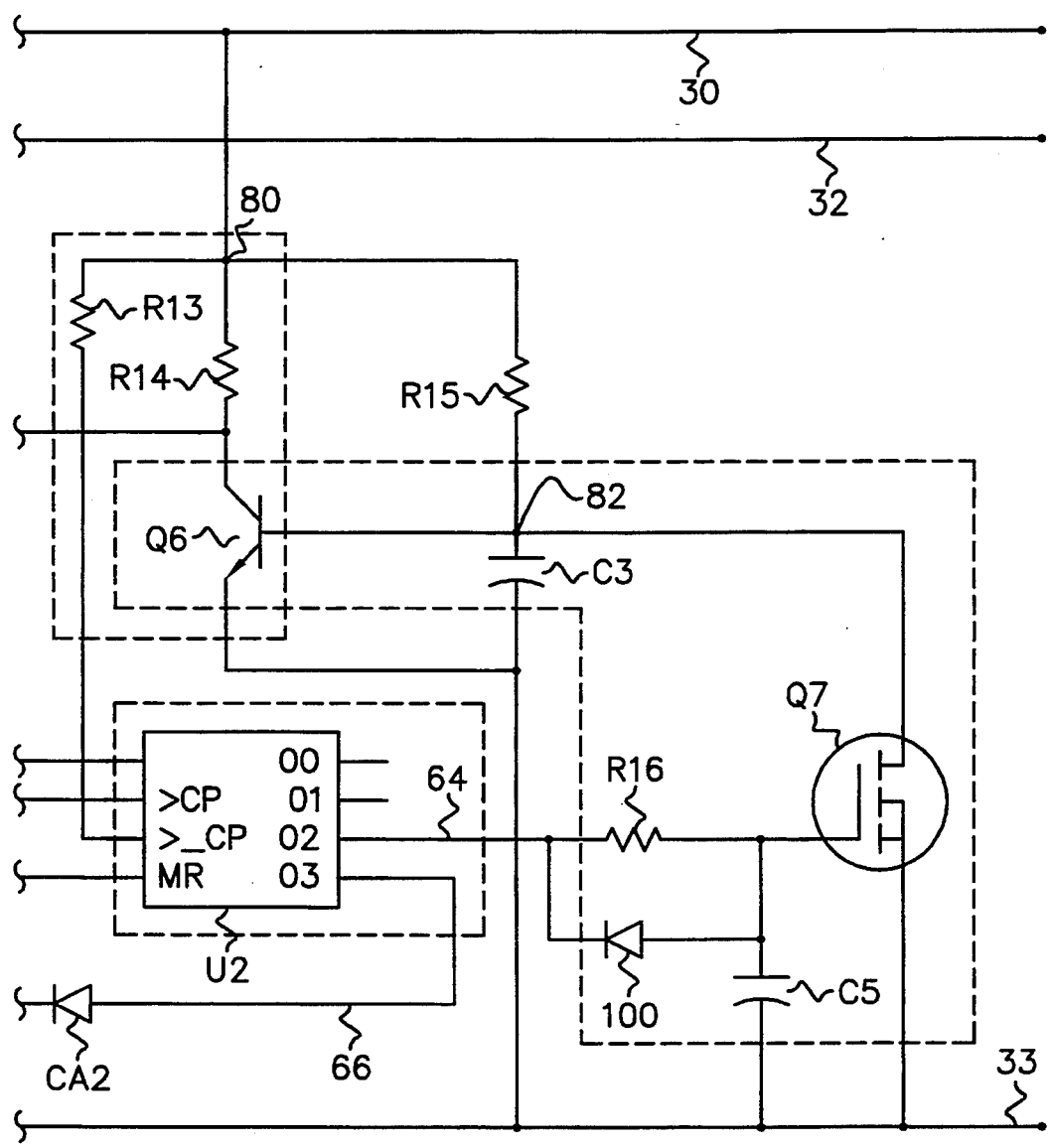

FIGS. 2A, 2B and 2C illustrate a schematic circuit that is used in a particularly preferred embodiment of the present invention. With reference to the figures it can be seen that the connection points, 20, 22, 23, 30, 32 and 33, are shown in both figures for purposes of facilitating the following description of the preferred embodiment of the present invention. With reference to FIG. 2A, connection point 20 is connectable to a voltage source 10 for the provision of power to the circuit. When the circuit shown in FIG. 2A is connected to a voltage source and a load, as illustrated in FIG. 1, a supply voltage $V_{cc}$ is provided between connection points 20 and 23. Through the operation of the regulator portion of the circuit in FIG. 2, a voltage $V_{REG}$ is provided for the operation of the circuit. In the following description, all voltages will be described in reference to electrical ground. Connection point 30 permits the sensor 16 to be connected to the circuit shown in FIG. 2C. Connection point 22 is connectable to the load 12 in order to dispose the circuit in FIGS. 2A, 2B and 2C electrically in series between the voltage source and the load. In the following Description of the Preferred Embodiment, connection point 20 is referred to as a first circuit point and connection point 22 is referred to as a second circuit point.

Connection point 32 provides a means by which the sensor 16 can communicate its condition to the circuit shown in FIGS. 2A, 2B and 2C and determine the connection status between the first and second circuit points, 20 and 22. For example, the sensor 16 can alternatively connect connection point 32 to ground or maintain it at a voltage potential above ground. These two conditions represent the two signals that can be provided by the sensor 16. When the sensor 16 connects connection point 32 to ground, PNP transistor Q5 becomes conductive and conducts a current through resistors R9 and R17 to the output of timer U1 if that output is at a voltage potential which is sufficiently below that of the supply voltage $V_{REG}$. The flow of current through resistors R9 and R17 turn on the NPN transistor Q4 which, in turn, turns on PNP transistor Q1. When transistor Q1 is conductive, a current flows between the first circuit point 20 and the second circuit point 22 through resistor R1 and transistor Q1. Therefore, the grounding of connection point 32, by affecting the conductive statuses of transistors Q5, Q4 and Q1, permits the first and second circuit points, 20 and 22, to be connected in electrical communication with each other and allows current to flow from the voltage source 10 to the load 12. It can be seen that a short circuit condition in load 12 can cause an overcurrent situation to arise in the portion of the circuit in FIG. 2A that comprises transistor Q1 and resistor R1. That condition could damage these components.

When a current flows from the first circuit point 20 to the second circuit point 22, a voltage drop exists across resistor R1. This creates a slight voltage differential between circuit point 40 and circuit point 42. When the current flowing through resistor R1 is less than the potential $V_{BE}$ necessary to cause transistor Q2 to conduct a current, transistor Q2 remains nonconductive and the first and second circuit points, 20 and 22, remain connected in electrical communication with each other. However, if the current flowing through resistor R1 exceeds a predetermined limit, the voltage potential $V_{BE}$ between circuit points 40 and 42 exceed that which is necessary to cause transistor Q2 to conduct a current. When that current limit is exceeded, which indicates that an overload condition has occurred somewhere in the circuit comprising load 12 and voltage source 10, the conduction of transistor Q2 through transistor Q2 and to the base of the NPN transistor Q3 is permitted. When transistor Q3 is conductive, the voltage at circuit point 44 drops to a voltage potential near ground and the trigger input of timer U1, at line 46, is reduced in voltage magnitude. When the voltage on line 46 drops to below approximately one third of the input voltage $V_{REG}$, the voltage output from timer U1 is connected to its voltage supply and the voltage at circuit point 50 rises to $V_{REG}$. This increase in voltage at circuit point 50 prevents a flow of current from the emitter of transistor Q4 and stops its conduction of current. This, in turn, stops conduction from the base of transistor Q1 and prevents the flow of current through resistor R1 and transistor Q1. In effect, the output voltage from timer U1 stops the current flow between the first and second circuit points, 20 and 22, in response to an overcurrent flowing through resistor R1. When this occurs, the discharge connection DISCH of timer U1 is effectively connected to a high impedance and the current flowing from the first circuit point 20, through resistors R19 and R8, charges capacitor C2. When the voltage at capacitor C2 rises to a value that is approximately two thirds of $V_{REG}$, the output of timer U1 decreases in voltage potential. Simultaneously, the discharge connection DISCH of timer U1 is effectively grounded and this discharges capacitor C2 As a result, current is again permitted to flow from transistor Q4 through resistor R10 to the output of timer U1 and to ground. When this occurs, the base of transistor Q1 again conducts current and the first and second circuit points, 20 and 22, are reconnected in electrical communication with each other. Therefore, it can be seen that the combination of resistors R19 and R8 and capacitor C2 provides a time delay between the time that the current between circuit points 20 and 22 is stopped by transistor Q1 and the time when current is again reinitiated by the decrease in voltage potential at the output of timer U1.

With continued reference to FIG. 2A, the rise in voltage potential at circuit point 50 also increases the voltage on line 60 and provides a clock input signal to counter U2. As can be seen, the binary output connections of counter U2 provide signals representing each of 4 bits. When the binary count reaches a magnitude of 4, a signal is provided on line 64 and, when the count stored by counter U2 reaches a value of 8, a signal is provided on line 66. When the count stored by counter U2 reaches the value of 8, the voltage on line 66 is connected to the input voltage $V_{REG}$. When line 66 is connected to the supply voltage $V_{REG}$ circuit point 70 is maintained at a sufficiently high voltage potential to bias transistor Q3 in a conductive state continuously. This, in turn, connects circuit point 44 to ground and maintains line 46 at a low voltage potential. Therefore, the timer U1 is forced to maintain its output at a voltage potential generally equal to the input voltage $V_{REG}$ and further conduction of current through transistor Q1 is prevented. The result of this operation is that eight consecutive fault conditions can be sensed and the current can be reinitiated following the stoppage of current after each of the first seven sensing events of an overcurrent condition. However, upon the occurrence of the eighth overcurrent sensing incident, the circuit is placed in a permanent nonconducting mode until a manual reset occurs. It should be understood that the choice of eight over current sensing incidents is arbitrary and not limiting to the scope of the present invention. Instead, any other number could have been selected for these purposes.

When power is initially introduced at connection point 20, the voltage at circuit point 80 is equal to $V_{REG}$. Until the voltage at circuit point 82 rises sufficiently to place transistor Q6 in a conductive state, the voltage on line 86 will be generally equal to $V_{REG}$ and the counter U2 will be reset. When capacitor C3 is charged, transistor Q6 will become conductive and line 86 will be connected to ground potential. This pulse on line 86 causes the counter U2 to be reset and its stored count is cleared.

It is recognized that spurious transient overvoltage conditions may cause the current flowing through resistor R1 to rise above the magnitude necessary to place transistor Q2 in a conductive state. If these sporadic voltage variations occur over a long period of time, it is not desirable that their accumulation cause the circuit in FIGS. 2A, 2B and 2C to be permanently disabled, as described above, when the count eventually reaches eight and an output signal on line 66 results. In order to prevent the sporadic voltage excursions from causing this type of inadvertent circuit shutdown, the output from counter U2 on line 64 is used to cause a reset condition of the counter U2 if the occurrence of the output signal on line 64 is not quickly followed by an output signal on line 66. In other words, if four overcurrent conditions occur and an additional four conditions do not follow within a preselected period of time, it is desirable that the counter U2 be reset. In order to accomplish this, a field effect transistor Q7 is provided and resistor R16 is connected with capacitor C5 at the gate of FET Q7. When the output signal on line 64 goes high to indicate the occurrence of a fourth overcurrent condition at resistor R1, capacitor C5 begins to charge.

Until capacitor C5 is charged, the voltage at the gate of FET Q7 will not be sufficient to cause the counter U2 to be reset. If the eighth overcurrent condition occurs before capacitor C5 is sufficiently charged, the circuit in FIGS. 2A, 2B and 2C will operate as described above and the base of transistor Q3 will be permanently provided with a high input voltage to prevent any reinitiations through transistor Q1. If, on the other hand, capacitor C5 is permitted to be completely charged, FET Q7 will conduct a current and that conduction of current will turn off transistor Q6. When transistor Q6 is turned off, the voltage potential on line 86 will rise and the counter U2 will be reset in response to capacitor C3 being discharged by the flow of current through FET Q7. The subsequent nonconducting condition of transistor Q6 is caused by this drop in voltage at circuit point 82. With continued reference to FIG. 2C, diode 100 is provided for the purpose of quickly discharging capacitor C5 when line 64 is changed from a high signal to a low signal. This rapid discharging of capacitor C5 occurs after the voltage on line 64 is set to a high signal and then reset to a low signal. This type of situation could occur as the counter U2 sequences the binary output from zero to eight.

Capacitor C4 and resistor R4 are provided in the circuit and connected to the line which connects the base of transistor Q3 to the collector of transistor Q2. Capacitor C4 is provided in the circuit for two reasons. First, it slows the response time sufficiently to permit capacitor C2 to completely discharge. In addition, it filters noise from circuit points 20 and 22 that could possibly exist on the line between connection point 40 and connection point 70.

With continued reference to FIGS. 2A, 2B and 2C it should be understood that the other components illustrated in the drawing, which are not described in detail above, are not directly related to the operation of the present invention although they are important to the normal operation of a sensor circuit. Other components shown in FIGS. 2A, 2B and 2C are useful in a preferred embodiment of the present invention, but are not absolutely required in all embodiments. The components shown in FIGS. 2A, 2B and 2C are described in Table I below.

TABLE I

| Reference | Type or Value |
| --- | --- |
| C1 | 0.01µ farad |
| C2 | 0.10µ farad |
| C3 | 0.01µ farad |
| C4 | 820 picofarad |
| C5 | 10.0µ farad |
| C6 | 22µ farad |
| CR1 | MMBD914T1 (Motorola) |
| Q1 | BCX52 (Philips) |
| Q2 | MMBT2907 (Motorola) |
| Q3 | MMBT2222AT2 (Motorola) |
| Q4 | MMBT2222A (Motorola) |
| Q5 | MMBT2907 (Motorola) |
| Q6 | MMBT2222A (Motorola) |
| Q7 | MMBF170 (Motorola) |
| Q8 | MP5W51A (Motorola) |
| R1 | 1.5Ω |
| R2 | 100KΩ |
| R3 | 39KΩ |
| R4 | 12KΩ |
| R5 | 10KΩ |
| R6 | 10KΩ |
| R7 | 56KΩ |
| R8 | 1.6MΩ |
| R9 | 1.8KΩ |
| R10 | 470Ω |
| R11 | 100KΩ |

TABLE I-continued

| Reference | Type or Value |
|---|---|
| R12 | 100KΩ |
| R13 | 10KΩ |
| R14 | 10KΩ |
| R15 | 56Ω |
| R16 | 5.76MΩ |
| R17 | 56KΩ |
| R18 | 4.7KΩ |
| R19 | 1.6MΩ |
| VR1 | 1N4753A |
| VR2 | 1N4753A |
| VR3 | SZ2133 (Motorola) |
| U1 | TLC555 (Texas Instruments) |
| U2 | 4518 (Motorola) |

Although the present invention has been described in significant detail and illustrated to show a particularly preferred embodiment of the present invention, it should be understood that alternative embodiments are also within the scope of the present invention.

The embodiments of the invention in which an exclusive property or right is claimed are defined as follows:

1. A circuit, comprising:
   means for comparing a magnitude of a current to a predetermined value, said current flowing between a first circuit point and a second circuit point;
   means for interrupting said current from flowing between said first circuit point and said second circuit point in response to said current exceeding said predetermined value;
   means for reinitiating said current flow upon the lapse of a predetermined period of time after said current is stopped by said interrupting means;
   means for counting the number of times that said current exceeds said predetermined value;
   means for preventing a reinitiation of said current after said current exceeds said predetermined value a preselected number of times, said counting means comprising a first means for providing a first output signal when said number of times that said current exceeds said predetermined value equals a first count, said counting means comprising a second means for providing a second output signal when said number of times that said current exceeds said predetermined value equals a second count, said preventing means being activated in response to said second output signal of said counting means; and
   means for resetting said counter when said first output exists for a predetermined period of time, said interrupting means comprising a first semiconductive component and a timer, said timer having an output connected in electrical communication with a second semiconductive component, said second semiconductive component being connected in electrical communication with said reinitiating means.

2. The circuit of claim 1, wherein:
   said comparing means comprises a resistor connected serially between said first and second circuit points.

3. The circuit of claim 1, wherein:
   said reinitiating means comprises a timer.

4. The circuit of claim 1, further comprising:
   means for resetting said counter when said circuit is initially provided with power.

5. An electrical circuit, comprising:
   first and second circuit points, said first and second circuit points being connectable and disconnectable in electrical communication with each other;
   means connected in electrical communication between said first and second circuit points, for monitoring a current flowing between said first and second circuit points;
   means connected in electrical communication with said monitoring means, for comparing said current to a preselected current magnitude;
   means connected in electrical communication with said comparing means for disconnecting said first and second circuit points from electrical communication with each other for a preselected period of time when said current exceeds said preselected current magnitude;
   a counter connected in electrical communication with said disconnecting means;
   means, connected in electrical communication with said disconnecting means, for incrementing a count stored in said counter upon each occurrence when said disconnecting means disconnects said first and second circuit points from electrical communication with each other;
   means, connected in electrical communication with said disconnecting means, for connecting said first and second circuit points in electrical communication with each other following an expiration of said preselected period of time;
   means, connected in electrical communication with said connecting means, for preventing said connecting means from connecting said first and second circuit points in electrical communication with each other when said count stored in said counter equals a first magnitude; and
   means for resetting said counter when said count doesn't equal said first preselected magnitude within a preselected time period, said disconnecting means comprising a first semiconductive component and a timer, said timer having an output connected in electrical communication with a second semiconductive component, said second semiconductive component being connected in electrical communication with said connecting means.

6. The circuit of claim 5, wherein:
   said first and second circuit points are connectable between a voltage source and an electrical load.

7. The circuit of claim 5, wherein:
   said monitoring means comprises a resistor connected between said first and second circuit points.

8. The circuit of claim 5, further comprising:
   means for resetting said counter upon an initial provision of power to said circuit.

* * * * *